(12) United States Patent
Amaya et al.

(10) Patent No.: US 8,833,540 B2
(45) Date of Patent: Sep. 16, 2014

(54) PALLET CHANGING SYSTEM AND MACHINING CENTER EQUIPPING THE SYSTEM

(75) Inventors: Kouichi Amaya, Fukui (JP); Toshihiko Kato, Fukui (JP); Masaki Kaneko, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 456 days.

(21) Appl. No.: 13/327,109

(22) Filed: Dec. 15, 2011

(65) Prior Publication Data

US 2013/0051958 A1 Feb. 28, 2013

(30) Foreign Application Priority Data

Aug. 22, 2011 (JP) ................................ 2011-180222

(51) Int. Cl.
*B23Q 7/04* (2006.01)
*B23Q 7/14* (2006.01)

(52) U.S. Cl.
CPC .............. *B23Q 7/1431* (2013.01); *B23Q 7/045* (2013.01); *B23Q 7/1494* (2013.01)
USPC ................... 198/346.1; 414/222.01

(58) Field of Classification Search
CPC ............ B23Q 7/00; B23Q 7/04; B23Q 7/048; B23Q 7/1431; B23Q 7/1478; B23Q 7/1489; B23Q 7/1494; B23Q 15/20
USPC ......... 29/784, 799; 198/341.08, 345.3, 346.1, 198/465.1; 227/39, 100; 414/222.01, 414/222.02, 222.03, 222.04, 222.05, 414/222.07, 222.09, 222.12, 225.01, 414/226.01, 226.05; 483/1, 13, 14
See application file for complete search history.

(56) References Cited

U.S. PATENT DOCUMENTS

| | | | | |
|---|---|---|---|---|
| 3,659,496 A | * | 5/1972 | Bergemann et al. | 409/47 |
| 3,804,426 A | * | 4/1974 | Mickas | 279/103 |
| 3,968,885 A | * | 7/1976 | Hassan et al. | 414/591 |
| 4,013,176 A | * | 3/1977 | Lohneis et al. | 414/730 |
| 4,065,988 A | * | 1/1978 | Lohneis et al. | 82/125 |
| 4,399,603 A | * | 8/1983 | Reed | 483/7 |
| 4,457,659 A | * | 7/1984 | Watanabe | 414/223.01 |
| 4,844,678 A | * | 7/1989 | Schenk | 414/223.01 |
| 5,065,499 A | * | 11/1991 | Luciano et al. | 29/799 |
| 5,213,559 A | * | 5/1993 | Lunazzi | 483/14 |
| 5,240,235 A | * | 8/1993 | Santandrea et al. | 269/50 |
| 5,265,497 A | * | 11/1993 | Curless | 74/608 |

(Continued)

FOREIGN PATENT DOCUMENTS

| | | |
|---|---|---|
| JP | 2000-24867 A | 1/2000 |
| JP | 2000-176782 A | 6/2000 |
| JP | 2005-81528 A | 3/2005 |

*Primary Examiner* — Saul Rodriguez
*Assistant Examiner* — Brendan Tighe
(74) *Attorney, Agent, or Firm* — Richard M. Goldberg

(57) ABSTRACT

A pallet changing system which utilizes the moving function itself of a machine head at a machining center for conveying a pallet and a configuration of a machining center equipping the system, combines a machine head 2 for machining a workpiece with a pallet changing unit 1 having a pallet changing arm 11 which can be rotated by a motor 13 and then allowed to move, by which a pallet 3 is conveyed, and the new pallet 3 for changing is changed with the existing pallet 3 gripped by a pallet clamping device 4 by turning the pallet changing arm 11, and a machining center which equips the above system and also machines a workpiece by using the machine head 2.

9 Claims, 9 Drawing Sheets

(a)    (b)

(56) References Cited

U.S. PATENT DOCUMENTS

| | | | | |
|---|---|---|---|---|
| 6,135,696 A * | 10/2000 | Haninger et al. | | 414/225.01 |
| 6,205,631 B1 * | 3/2001 | Schweizer | | 29/33 P |
| 6,409,641 B1 * | 6/2002 | Hashimoto | | 483/13 |
| 6,436,021 B2 * | 8/2002 | Nukui | | 483/1 |
| 6,679,369 B2 * | 1/2004 | Okuyama | | 198/346.1 |
| 6,846,276 B2 * | 1/2005 | Yasumatsuya et al. | | 483/1 |
| 7,047,706 B2 * | 5/2006 | Kraenzle | | 53/247 |
| 7,478,720 B2 * | 1/2009 | Bernhard et al. | | 198/346.1 |
| RE40,690 E * | 3/2009 | Haninger et al. | | 414/225.01 |
| 7,621,031 B2 * | 11/2009 | Kawai et al. | | 29/33 P |
| 7,694,799 B2 * | 4/2010 | Bae | | 198/346.1 |
| 7,909,154 B2 * | 3/2011 | Yoshida | | 198/346.1 |
| 2006/0010681 A1 * | 1/2006 | Bernhard et al. | | 29/563 |
| 2006/0013675 A1 * | 1/2006 | Bernhard et al. | | 414/225.01 |
| 2008/0067035 A1 * | 3/2008 | Keith et al. | | 198/345.3 |

* cited by examiner (a)

(b)

(c)

(a)

(b)

(c)

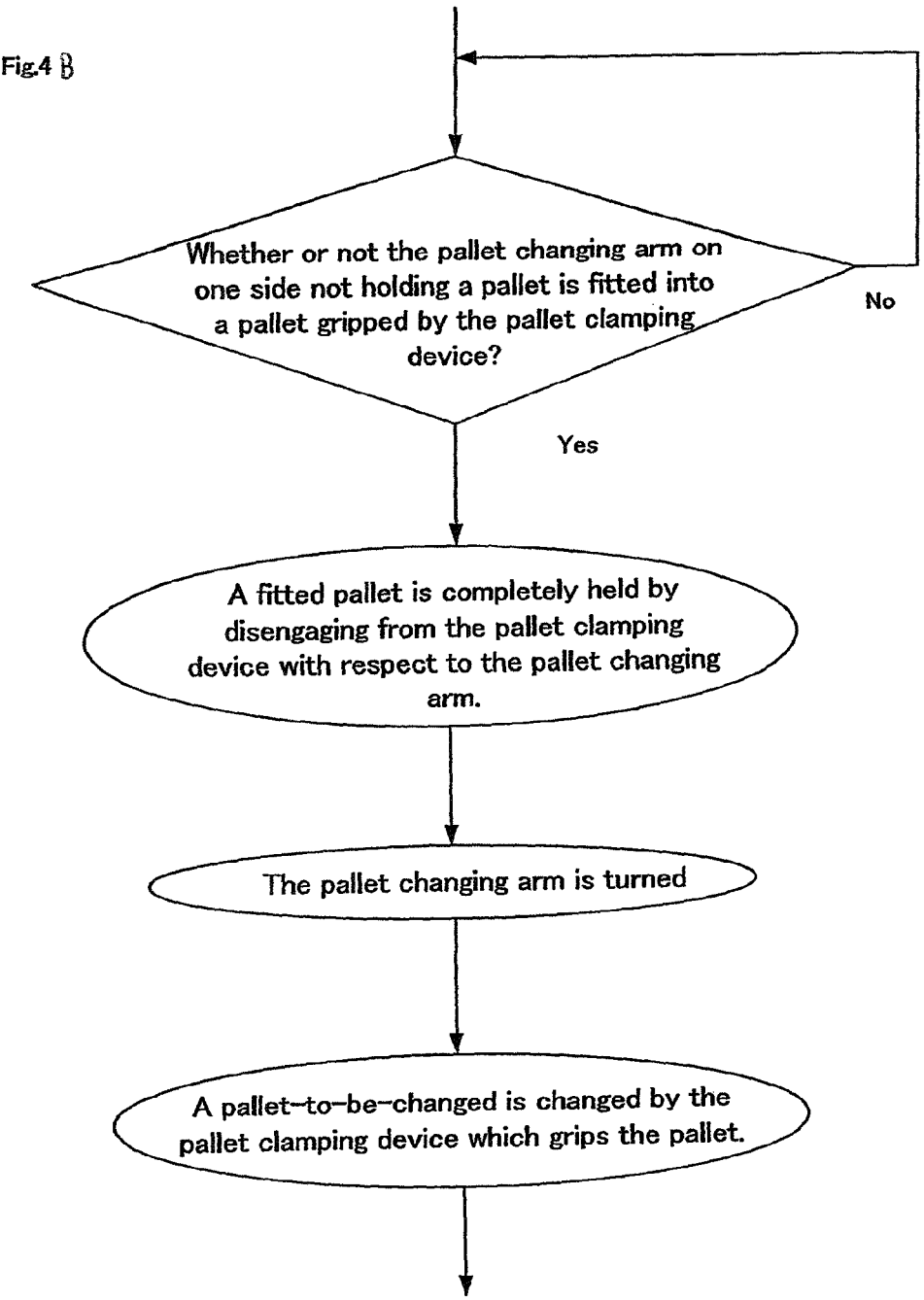

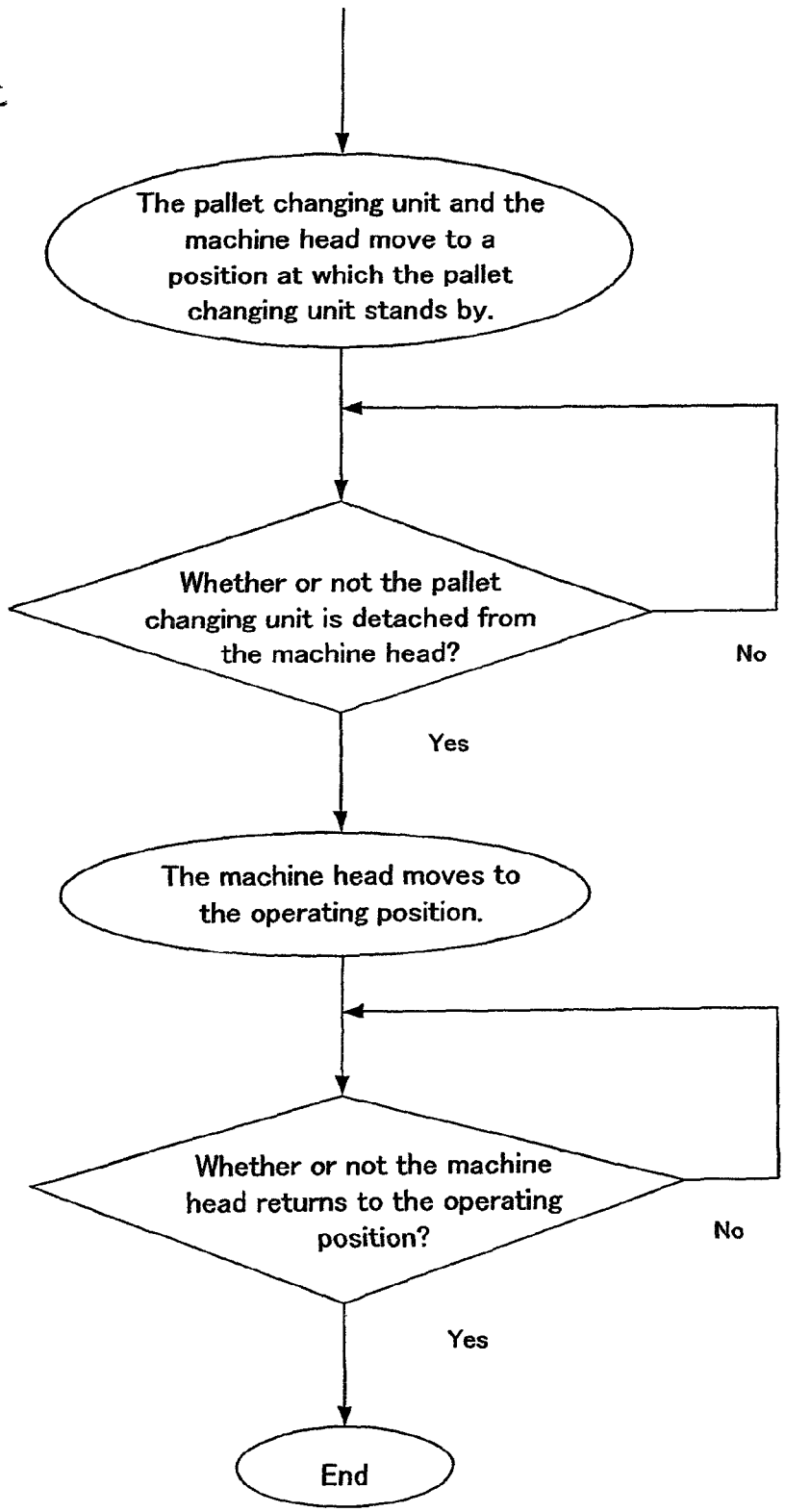

(a)

(b)

US 8,833,540 B2

PALLET CHANGING SYSTEM AND MACHINING CENTER EQUIPPING THE SYSTEM

TECHNICAL FIELD

This invention relates to a pallet changing system which changes a pallet that supports a workpiece at an operating leading-end portion of a machine head and gripped by a pallet clamping device with a pallet for changing which is placed at a set-up station to support the other workpiece.

BACKGROUND ART

The pallet clamping device arranges the workpiece at a leading-end operating position of the machine head via the gripped pallet, and the pallet for changing is arranged at the set-up station.

In conventional techniques, in the case of changing a pallet with the pallet clamping device, an external device is used to convey the pallet between the clamping device and the set-up station.

Further, conveyance of the pallet is with no relation whether the pallet clamping device is a movable type or a fixed type.

In typical system, the pallet is conveyed by a pallet changing arm device capable of expanding and reducing an arm in a multiple stage or a pallet changing arm device capable of moving in itself.

However, since the pallet changing arm device capable of expanding and reducing the arm needs a larger installation space and the device only changes a pallet one by one, it inevitably needs a longer time to change a pallet.

On the other hand, the movable-type pallet changing arm device inevitably needs a control device for moving and stopping the arm, and the control device inevitably requires a more complicated configuration than the pallet changing arm device capable of expanding and reducing the arm.

In Patent Document 1 in which the patent right was obtained by applicant, attention is taken to the fact that a spindle which moves at the leading-end portion of the machine head is able to move freely, and so a pallet for machining is gripped by a spindle head on one side of a pallet changing arm (a pallet gripping arm), whereas a pallet for changing is gripped on the other side thereof. Thereby, when the spindle head descends, the pallet changing arm is allowed to ascend and, thereafter, the pallet changing arm is rotated, by which the pallets are changed efficiently.

In the above-described configuration, the pallet changing arm also acts as the pallet clamping device, and so, an ascending mechanism necessary for changing a pallet is relatively simple.

However, the above-described pallet changing arm needs an external driving device for moving the pallet changing arm and is placed over an operating position of the spindle head and the set-up station. So, above-described configuration inevitably needs a long and large space resultingly.

In Patent Document 2, a shoulder rail is provided on a pallet changing arm which can turn, and a pallet for changing is allowed to move on the rail. In above-described configuration, a mechanism of expanding and reducing the pallet changing arm or a mechanism of moving the pallet changing arm is unnecessary, and so may improve the conventional techniques.

However, the above-described configuration inevitably needs such another special control that in the case of pallet for changing being moved from an end portion side of the pallet changing arm to the center side of turning, the other pallet for supporting a workpiece which has been already machined by another operation is ascended and, contrary in the case of the other pallet being moved from the center position of the turning of the pallet changing arm to the end portion side thereof, the pallet for changing is descended.

In Patent Document 3, the leading end sides of intermediate portions on both sides of the pallet changing arm are supported pivotally at an upper perpendicular region so as to rotate freely and the leading end sides may be kept in upper position along perpendicular direction, with a certain angle according to the horizontal direction. Thereby, the pallet clamping device is compact in space and a pallet gripped by the pallet clamping device is changed by a simple configuration to improve the conventional techniques.

However, in the configuration disclosed in the above-described Patent Document 3, it is inevitably necessary to control the rotation of the arm on one side which takes out the pallet gripped by the pallet clamping device. And, such a mechanism invites another complex procedure which is different from in the conventional techniques.

Considering above-described conventional techniques and publicly known techniques such as Patent Documents 1, 2, and 3, it is apparent that pallet changing system which utilizes the moving function itself of the machine head for conveying a pallet has not been proposed, though the machine head of operating the spindle is capable of movement.

PRIOR ART DOCUMENTS

Patent Documents

[Patent Document 1] Japanese Published Unexamined Patent Application No. 2005-81528
[Patent Document 2] Japanese Published Unexamined Patent Application No. 2000-176782
[Patent Document 3] Japanese Published Unexamined Patent Application No. 2000-24867

SUMMARY OF THE INVENTION

Problems to be Solved by the Invention

An object of the present invention is to provide a configuration of pallet changing system which utilizes the moving function itself of a machine head at a machining center for conveying a pallet and a configuration of a machining center equipping the system.

Means for Solving the Problem

In order to attain the above object, the present invention is basically configured as follows:
(1) a pallet changing system which changes a pallet supporting a workpiece at an operating leading-end portion of a machine head and also gripped by a pallet clamping device with an another pallet for changing, placed at a set-up station and supporting the other workpiece,
comprising that a pallet changing unit equipping a rotational pillar rotating integrally with a pallet changing arm and a motor for driving the rotational pillar is installed such as capable of the state combined with the machine head and the state detached from the machine head and control unit is provided for controlling the machine head and the pallet changing unit according to each following processes:

I. a process of operating the machine head and fixing the pallet changing unit which holds a pallet for changing at a standing-by position;

II. a process of moving the machine head which has completed a predetermined unit of operation to said standing-by position and combining the machine head with the pallet changing unit after the movement;

III. a process of moving the machine head which is combined with the pallet changing unit to the side of the pallet clamping device, fitting an arm on one side not holding a pallet for changing, of arms on both sides of the pallet changing arm, into a pallet gripped by the pallet clamping device after the above movement, and attaining the state of pallet apart from the arm which has been gripping the pallet;

IV. a process of turning the pallet changing arm;

V. a process of changing a pallet for changing with a pallet gripped by the pallet clamping device;

VI. a process of returning the machine head which is combined with the pallet changing unit to said standing-by position and detaching the machine head from the pallet changing unit after the above returning; and (2) a machining center which equips the above-described (1) of the pallet changing system and also machines a workpiece by using the machine head.

DESCRIPTION OF REFERENCE NUMERALS

Figure 1:
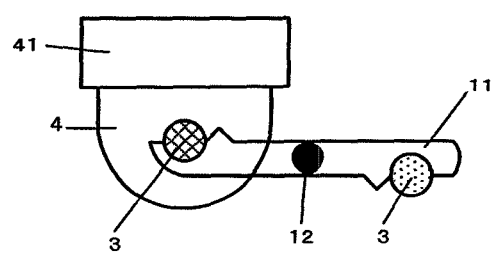
FIG. 1 is a plan view which shows operation of Embodiment 1 wherein (a) shows a stage that a pallet changing arm which does not hold a pallet is fitted into a pallet gripped by a pallet clamping device by the process III and, thereafter, the pallet changing arm holds the pallet, (b) shows a state that a machine head which is combined with the pallet changing unit moves from a position of the process III, thereby conducting turning of the process IV at a space in which turning is allowed, and (c) shows a state that after the turning of the process IV, the pallet changing arm which has moved to the side of the pallet clamping device changes the pallet at the process V (the crisscrossing diagonal lines indicate a flat surface state of the pallet at a stage of operation completion of the machine head, while the dots indicate a flat surface state of the pallet for changing).
Figure 1:
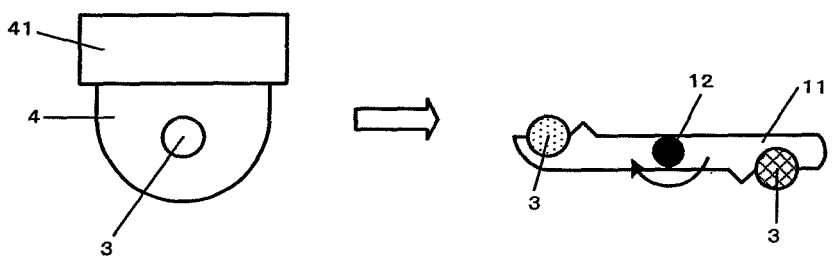
Figure 1:
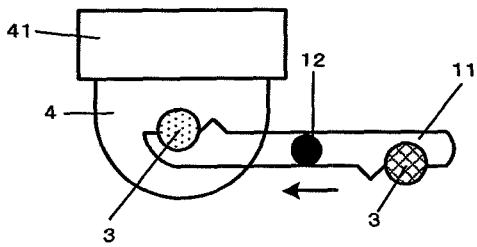

1: pallet changing unit
11: pallet changing arm
12: rotational pillar
13: motor
14: reduction gear
15: projected frame
2: machine head
20: operating portion of machine head
21: hydraulic cylinder
22: hydraulic piston
23: coil
24: electromagnet
3: pallet
30: workpiece supported by pallet
4: pallet clamping device
41: supporting portion of pallet clamping device
5: convex portion
6: recessed portion
7: fixed portion

MODE(S) FOR CARRYING OUT THE INVENTION

In the above-described basic configurations (1) and (2), it is fundamental feature that the pallet changing unit 1 may be combined with the machine head 2 and may move integrally with the machine head 2, and so, necessary control is undergone for conveying and changing a pallet 3.

Figure 3:
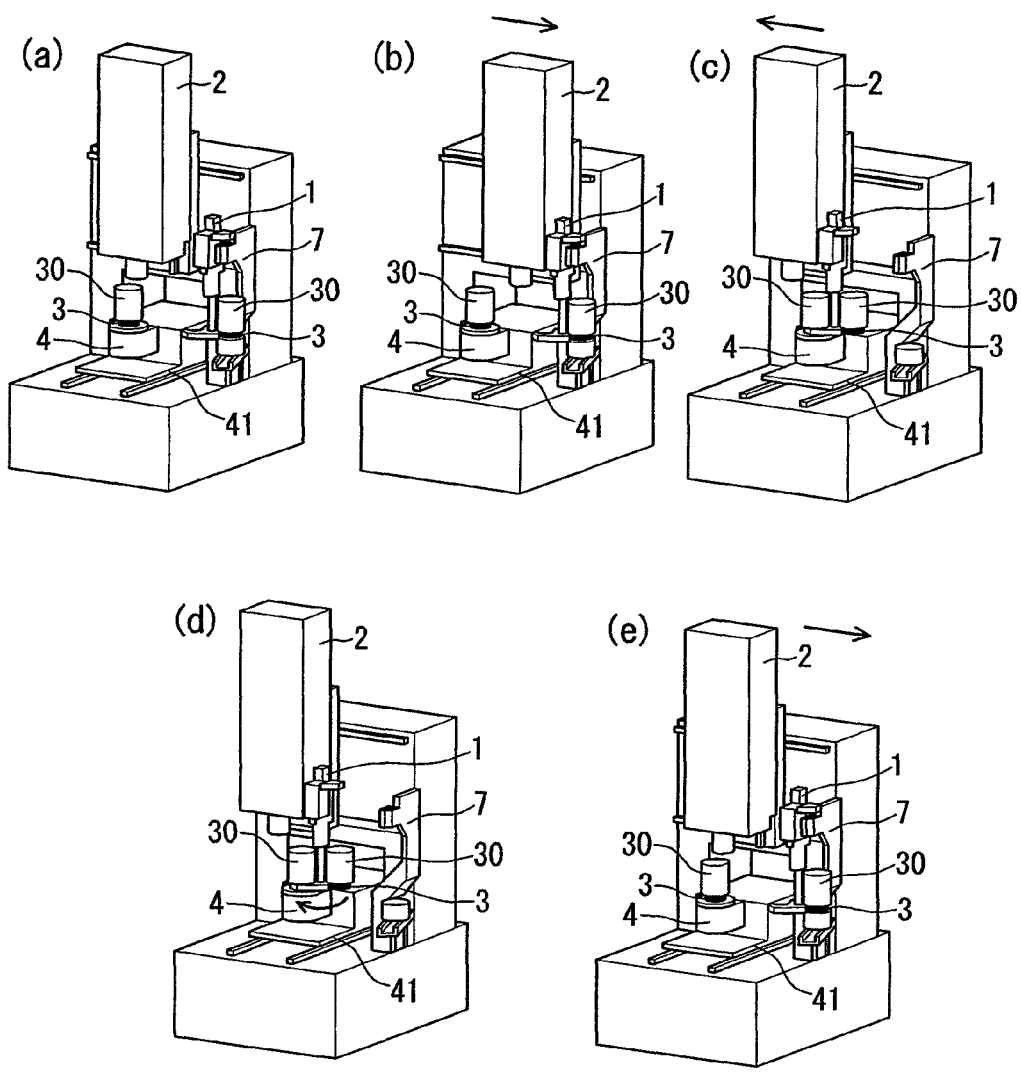
FIG. 3 shows a mechanism principle of the pallet changing system based on a typical embodiment of this invention in accordance with each process of the basic configuration (1) wherein (a) shows the process I, (b) shows the process II, (c) shows the process III, (d) shows the process IV and the process V, and (e) shows the process VI.

In summing, as shown in FIG. 3, the control of following processes is adopted to change the pallet 3;

I. the process of operating the machine head 2 and keeping the pallet changing unit 1 at a stand-by position (FIG. 3(a)), II. the process of moving the machine head 2 to said standing-by position and, thereafter, combining the machine head 2 with the pallet changing unit 1 (FIG. 3(b)), III. the process of moving the machine head 2 combined with the pallet changing unit 1 to an operating position, thereafter, fitting the pallet changing arm 11 into the pallet 3, and gripping the pallet 3 (FIG. 3(c)), IV. the process of turning the pallet changing arm 11 (FIG. 3(d)), V. the process of changing the pallet 3 by the pallet changing arm 11 (FIG. 3(d)), and VI. the process of returning the machine head 2 combined with the pallet changing unit 1 to said sanding-by position (FIG. 3(e)).

Figure 7:
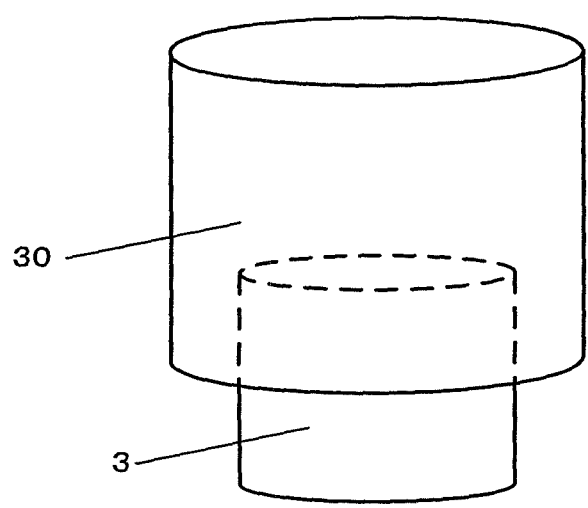
FIG. 7 is a sketch which shows a state that a pallet supports a workpiece.

As is shown in FIG. 3, a space region occupied by the pallet 3 which supports a workpiece 30 (a region printed in black) is relatively small and difficult to notice. So, FIG. 7 shows a state that the pallet 3 supports the workpiece 30.

Whether the pallet changing arm 11 can be turned at the process IV or not immediately after the pallet is held by the pallet changing arm 11 at the process III depends on whether a space available for the turning of the process IV exists or not in the vicinity of the pallet clamping device 4.

FIG. 3 shows the embodiments where the above-described space is in particular available. A position at which the pallet changing arm 11 completely holds the pallet 3 at the process III, a position at which the pallet 3 is changed at the process V and a position at which the pallet changing arm 11 is turned at the process IV are all the same.

The case in which the above-described space is not available is described later in Embodiment 1 and Embodiment 2.

Figure 4:
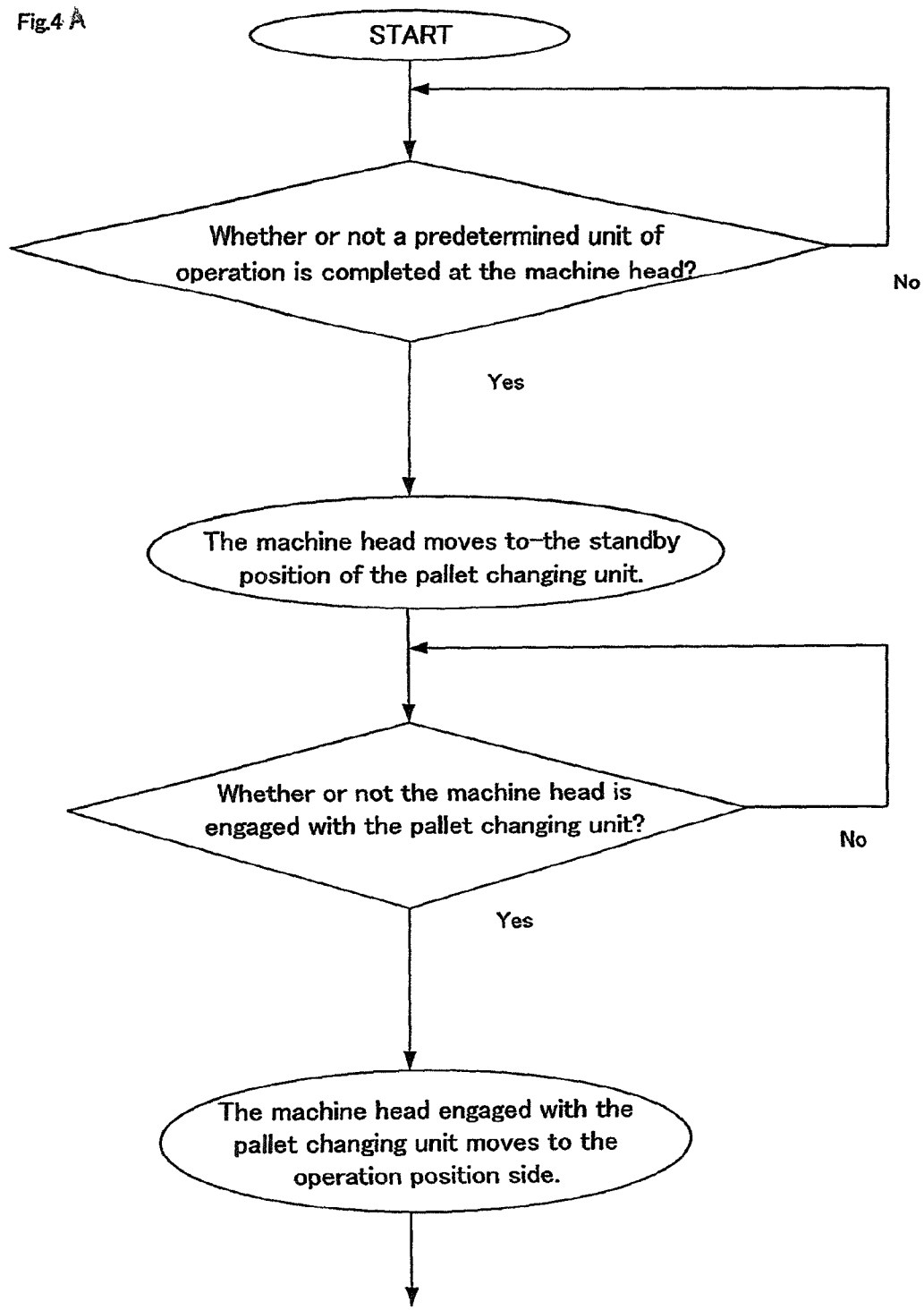
FIG. 4 shows a flowchart which is necessary for a computer used for controlling the embodiment given in FIG. 3.

FIG. 4 shows a flowchart covering the operation of a computer necessary for controlling the above-described embodiments.

The flowchart given in FIG. 4 also shows an ordinary step where the machine head 2 further returns in itself to an operating position after the return of the process VI.

Figure 5:
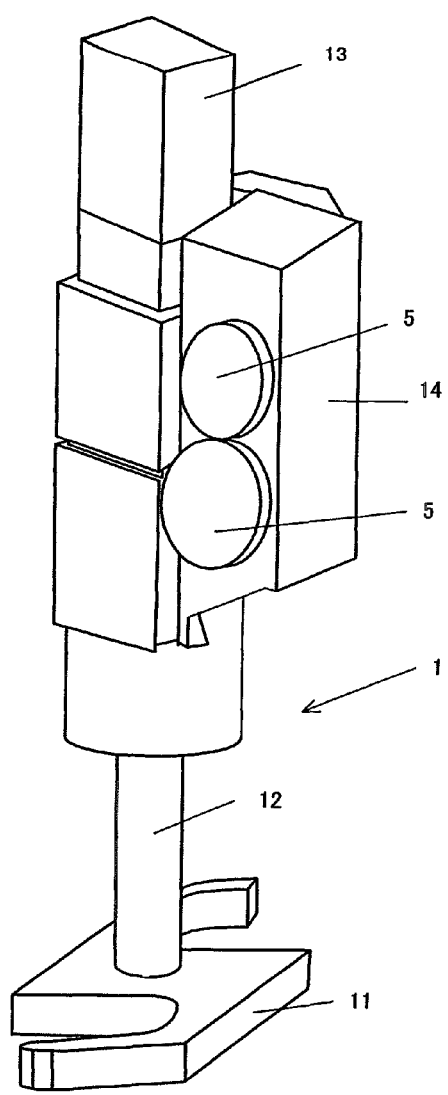
FIG. 5 is a sketch which shows an embodiment of the pallet changing unit wherein (a) shows the side which has a convex portion necessary for combining with the machine head, and (b) shows the side opposite to the side having the convex portion.
Figure 5:
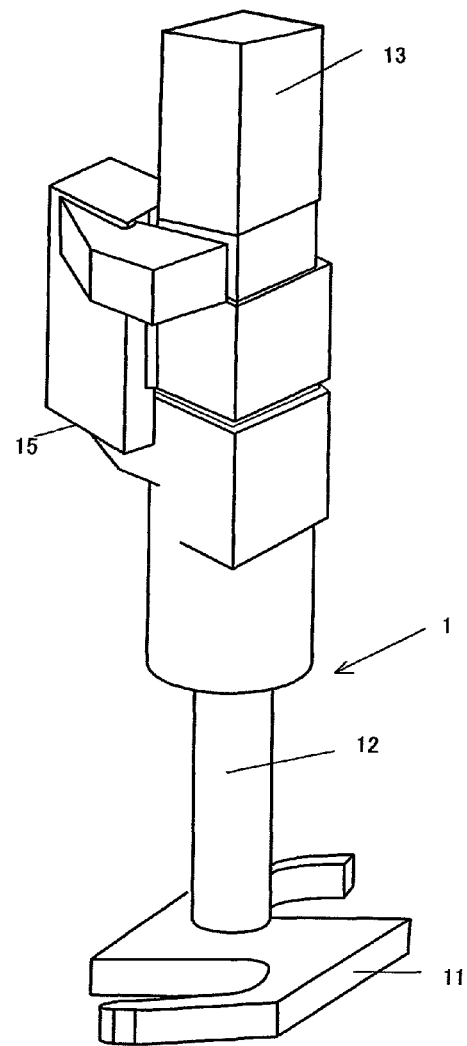

As shown in FIG. 5, the pallet changing unit 1 of this invention is equipped with a rotational pillar 12 which supports the pallet changing arm 11 to rotate integrally together with the pallet changing arm 11 and a motor 13 for rotating the pillar 12.

The embodiment given in FIG. 5 shows a state that, as is described later, the convex portion 5 which is fitted into a recessed portion 6 of the machine head 2 is installed, and the reduction gear 14 for the rotation of the motor 13 is installed, and a convex frame 15 to be placed at a fixed portion 7 is also provided.

Various configurations may be adopted as embodiments in which the pallet changing unit 1 is freely capable of the state engaged with the machine head 2 and the state detached from the machine head 2 is available in various configurations.

A configuration which can be selected most easily is that in which the machine head 2 is provided with a robot mechanism capable of gripping and disengaging from gripping of the pallet changing unit 1, thereby engaging the pallet changing unit 1 with the machine head 2 or detaching the pallet changing unit 1 therefrom.

However, regarding the robot mechanism, the robot mechanism in itself may be used to change the arm. And, it is not effective to use the robot mechanism in engaging the pallet changing unit 1 with the machine head 2 or detaching the pallet changing unit 1 therefrom.

Moreover, this invention adapts adopts a simple configuration, compared with conventional techniques in which the pallet changing arm 11 needs an expanding and reducing mechanism or a movable mechanism, adoption of the robot mechanism is not necessarily a preferred embodiment.

The above-described engagement and detachment of the pallet changing unit 1 is realized by an embodiment in which the convex portion 5 is provided at one of the pallet changing unit 1 and the machine head 2 and the recessed portion 6 is provided at the other of them, by which they are fitted with each other to attain engagement of the process II.

Figure 6:
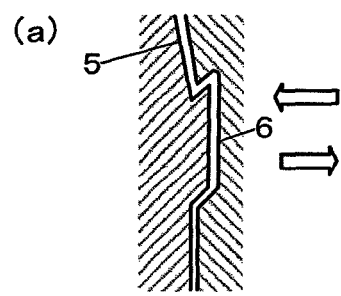
FIG. 6 shows embodiments in which the pallet changing unit is freely capable of the state engaged with the machine head and the state detached from the machine head wherein (a) shows an embodiment where a direction at which the convex portion projects out and a direction at which the recessed portion projects in, respectively related to a personal computer, are given as a direction intersecting with a direction at which the machine head moves integrally with the pallet changing unit (the white arrows indicate the moving direction of the machine head and the pallet changing unit), (b) shows an embodiment in which a piston of a hydraulic cylinder on the machine head is used to push a periphery of the convex portion at the pallet changing unit via a clearance of a wall portion at the recessed portion, and (c) shows an embodiment in which the convex portion provided at the pallet changing unit is a magnetic body, and an electromagnet on the machine head is used to attract a periphery of the convex portion provided at the pallet changing unit via the clearance of the wall portion at the recessed portion.
Figure 6:
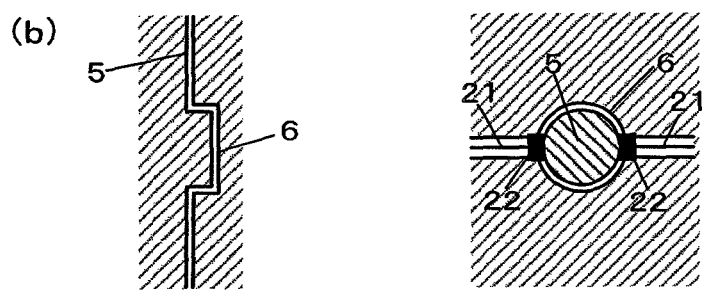
Figure 6:
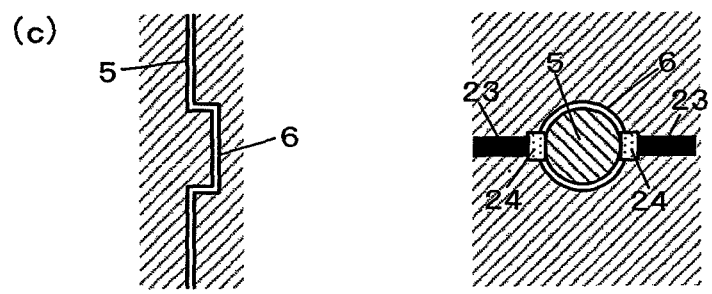

FIG. 6(a) shows an embodiment in which a direction at which the convex portion 5 projects out and a direction at which the recessed portion 6 projects in intersect with the moving direction of the pallet changing unit 1 and the machine head 2, of the embodiments which adopt the recessed portion 6 and the convex portion 5.

In other words, the projecting-out and projecting-in directions of the convex portion 5 and the recessed portion 6 which are mutually fitted are selected as a direction intersecting with a direction at which the machine head 2 moves in a state of being engaged with the pallet changing unit 1. So, the pallet changing unit 1 and the machine head 2 can be prevented from a failure in a mutually fitted state, even in the case that a change in acceleration or an impact due to the above-described movement occurs, by fitting the convex portion 5 provided at one of them to the recessed portion 6 provided at the other of them.

In FIG. 6(b), the convex portion 5 is provided at the pallet changing unit 1, the recessed portion 6 is provided at the machine head 2, and also provided is a hydraulic piston 22 which uses a mechanism of a hydraulic cylinder 21 installed at the machine head 2 to push the convex portion 5 via a clearance at a periphery of the recessed portion 6 when the recessed portion 6 is fitted into the convex portion 5.

In other words, as shown in FIG. 6(b), the machine head 2 is firmly engaged by using the hydraulic piston 22 to push the convex portion 5 of the pallet changing unit 1 based on the hydraulic cylinder 21 provided for moving a working machine such as the rotational spindle, etc. So, it is possible to prevent the pallet changing unit 1 and the machine head 2 from a failure in a mutually fitted state.

In FIG. 6(c), the convex portion 5 is provided at the pallet changing unit 1 by using a magnetic body, the recessed portion 6 is provided at the machine head 2, and also provided is an electromagnet 24 which attracts the convex portion 5 via a clearance at a periphery of the recessed portion 6 by using a conductive system provided at the machine head 2 when the recessed portion 6 is fitted into the convex portion 5.

In other words, as shown in FIG. 6(c), the machine head 2 is firmly engaged quickly by attracting the convex portion 5 provided at the pallet changing unit 1 by the electromagnet 24 based on the conductive system provided for controlling a working machine such as the rotational spindle, etc. So, it is possible to prevent the pallet changing unit 1 and the machine head 2 from a failure in a mutually fitted state.

Hereinafter, a description will be given in accordance with the embodiments.

Embodiment 1

As shown in FIG. 1, Embodiment 1 is characterized that in a case where no space for turning the pallet changing arm 11, with a pallet 3 being held, is available at a periphery of the pallet clamping device 4, a process is conducted wherein, after the process III, the machine head 2 engaged with the pallet changing unit 1 moves to a position where a space is available which allows the pallet changing arm 11 to turn, then, the turning of the process IV is conducted, and after the engaged machine head 2 moves to the side of the pallet clamping device 4, the pallet 3 is changed by the process V.

In other words, as shown in FIG. 1(b), Embodiment 1 is that in which based on further movement of the machine head 2 engaged with the pallet changing unit 1 from a position of the process III, the pallet changing arm 11 is turned at the process IV and, pallet 3 can be changed resultingly even in the case that a periphery of the pallet clamping device 4 is a compact space.

Embodiment 2

Figure 2:
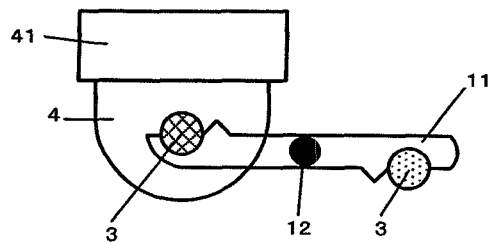
FIG. 2 is a plan view which shows a pallet changing state of Embodiment 2 wherein (a) shows a stage that a pallet changing arm which does not hold a pallet is fitted into a pallet gripped by the pallet clamping device by the process III and, thereafter, holding the pallet, (b) shows a state that the pallet clamping device and a supporting base thereof move from a position of the process III, by which the pallet changing arm which holds a pallet conducts the turning of the process IV at a space where turning is allowed, and (c) shows a state that after the turning of the process IV, the pallet clamping device and the supporting base thereof return to a position before the above-described movement, thereby changing the pallet at the process V (the crisscrossing diagonal lines indicate a flat surface state of the pallet at a stage of operation completion of the machine head, and dots indicate a flat surface state of the pallet for changing).
Figure 2:
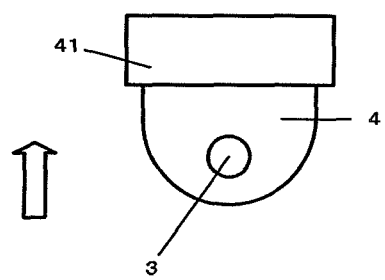
Figure 2:
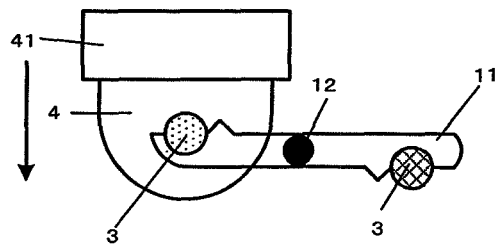

As shown in FIG. 2, Embodiment 2 is characterized that in which where no space for turning the pallet changing arm 11, with a pallet 3 being held, is available at a periphery of the pallet clamping device 4, before or after the pallet 3 is completely held by the pallet changing arm 11 at the process III or at the same time when the pallet 3 is completely held, a process is conducted in which the pallet clamping device 4 and a supporting portion 41 for supporting the clamping device 4 move from a position of the process III to form the above-described space, thereafter, the turning of the process IV is conducted and, further, the pallet 3 is changed by the process V after the pallet clamping device 4 and the supporting portion 41 thereof return to the position before they moved.

In other words, in Embodiment 2 as well, as shown in FIG. 2(*b*), based on movement of the pallet clamping device 4 and the supporting portion 41 thereof, the pallet changing arm 11 is turned at the process V and, the resultant pallet 3 can be changed even where a periphery of the pallet clamping device 4 is a compact space.

Effect of the Invention

The present invention based on the basic configurations (1), (2) eliminates a necessity for an expanding and reducing mechanism and a movable mechanism for conveyance of a pallet as needed in a conventional arm device, thus making it possible to save a space needed for expansion and reduction and a special control device needed for movement. So, it is possible to reduce production costs.

Further, since the machine head may move at high speeds, it is possible to reduce the time for conveyance of a pallet and also change the pallets efficiently.

Still further, as given in each of the embodiments described above, where the pallet changing unit and the machine head or the pallet clamping device is allowed to move to a predetermined position and the pallet changing arm is thereafter turned, it is also possible to change a pallet in a limited space.

The present invention is applicable to any pallet changing system and also to any machining center which has the pallet changing system and machines a workpiece by using a machine head. The present invention is in particular appropriate in changing a pallet at a small space in a short period of time.

What is claimed is:

1. A pallet changing system which changes a pallet supporting a workpiece at an operating leading-end portion of a machine head and also gripped by a pallet clamping device with an another pallet, placed at a setup station and supporting another workpiece, comprising:
   a rotational pillar,
   a pallet changing unit connected to the rotational pillar and including a pallet changing arm rotating integrally with said rotational pillar,
   a motor for driving the rotational pillar between a state combined with the machine head and a state detached from the machine head, and
   a control unit for controlling the machine head and the pallet changing unit to perform the following operations:

I. operating the machine head and fixing the pallet changing unit such that one end of the pallet changing arm holds a first pallet for changing at a standing-by position;
   II. moving the machine head which has completed a predetermined unit of operation to said standing-by position and combining the machine head with the pallet changing unit after the movement;
   III.
      A. moving the machine head which is combined with the pallet changing unit to a side of the pallet clamping device,
      B. fitting another end of the pallet changing arm to a second pallet gripped by the pallet clamping device after the movement of the machine head has been combined with the pallet changing unit, and
      C. attaining a state of separating the second pallet from the pallet clamping device which has been gripping the second pallet;
   IV. turning the pallet changing arm;
   V. changing a the second pallet with the first pallet such that the first pallet is now gripped by the pallet clamping device; and
   VI.
      A. returning the machine head which is combined with the pallet changing unit to said standing-by position, and
      B. detaching the machine head from the pallet changing unit after the above returning.

2. The pallet changing system according to claim 1, wherein a position at which the pallet changing arm holds the second pallet during operation III, a position at which the second pallet is changed at the operation V and a position at which the pallet changing arm is turned at the operation IV are all the same.

3. The pallet changing system according to claim 1, wherein, where there is no space for turning the pallet changing arm, with a first and second pallet being held, after the operation III, the control unit controls the machine head engaged with the pallet changing unit to move to a position where a space is available which allows the pallet changing arm to turn, then controls the turning of the pallet changing arm in operation IV, and after the engaged machine head moves to the side of the pallet clamping device, controls changing of the pallets by the operation V.

4. The pallet changing system according to claim 1, wherein, where there is no space for turning the pallet changing arm, with a first and second pallet being held, before, after or at the same time the second pallet is completely held by the pallet changing arm at the process operation III, the control unit controls the pallet clamping device and a supporting portion for supporting the clamping device to move from a position of the operation III to form the above-described space, thereafter controlling the turning in the operation IV, and then controlling changing of the second pallet the operation V after the pallet clamping device and the supporting portion thereof return to the position before they moved.

5. The pallet changing system according to claim 1, further comprising:
   a convex portion at one of the pallet changing unit and the machine head, and
   a recessed portion at the other of the pallet changing unit and the machine head, by which the convex portion and recessed portion they are fitted with each other to attain engagement during the operation II.

6. The pallet changing system according to claim 5, wherein the convex portion projects out and the recessed portion projects in, in a moving direction of the pallet changing unit and the machine head.

7. The pallet changing system according to claim 5,
wherein the convex portion is provided at the pallet changing unit,
wherein the recessed portion is provided at the machine head, and
further comprising a hydraulic piston which includes a hydraulic cylinder installed at the machine head to push the convex portion via a clearance at a periphery of the recessed portion when the recessed portion is fitted with the convex portion.

8. The pallet changing system according to claim 5,
wherein the convex portion is provided at the pallet changing unit and includes a magnetic body,
the recessed portion is provided at the machine head, and
further comprising an electromagnet which attracts the convex portion via a clearance at a periphery of the recessed portion by using a conductive system provided at the machine head when the recessed portion is fitted with the convex portion.

9. A machining center which includes a pallet changing system according to claim 1 and a machine head for machining a workpiece by using a machine head.

* * * * *